(No Model.)

I. C. GRAY.
TIRE TIGHTENER.

No. 596,495. Patented Jan. 4, 1898.

Witnesses
R. Dorsey Oates
George Wakefield

Inventor
Isaac C. Gray
By Wm H Bates.
Attorney

THE NORRIS PETERS CO., PHOTO-LITHO., WASHINGTON, D. C.

UNITED STATES PATENT OFFICE.

ISAAC CLINTON GRAY, OF TIPPECANOE, INDIANA, ASSIGNOR OF TWO-THIRDS TO ANDREW J. TIPTON AND WILLIAM VANTREESE, OF MENTONE, INDIANA.

TIRE-TIGHTENER.

SPECIFICATION forming part of Letters Patent No. 596,495, dated January 4, 1898.

Application filed September 7, 1897. Serial No. 650,786. (No model.)

*To all whom it may concern:*

Be it known that I, ISAAC CLINTON GRAY, a citizen of the United States, residing at Tippecanoe, in the county of Marshall and State of Indiana, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in tire-tighteners in which a metal felly is interposed in the rim of a wheel and a draw-bolt is fixed to the end of the tire and extends through a mortise in the felly, whereby the tire may be tightened.

The object of my invention is to provide a device of the kind named and for the purpose stated which will be simple in construction and efficient in its operation and durable in use.

With these ends in view the invention consists in the novel construction and combination of parts, as will be hereinafter more in detail described, and particularly pointed out in the claims.

Figure 1:
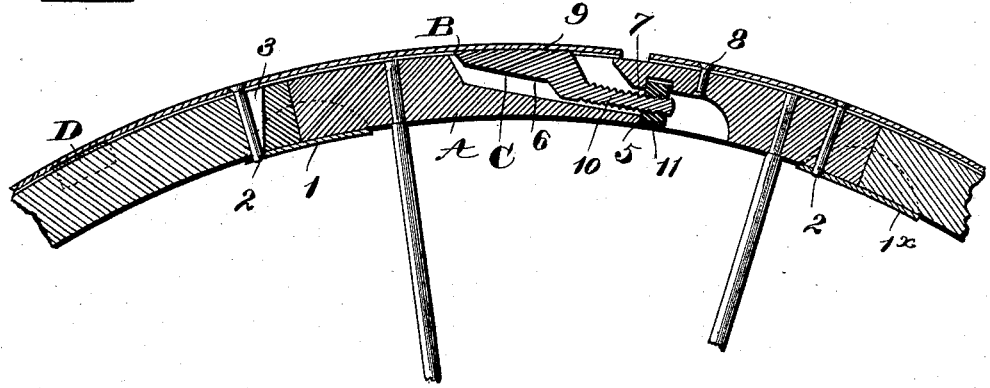
Figure 2:
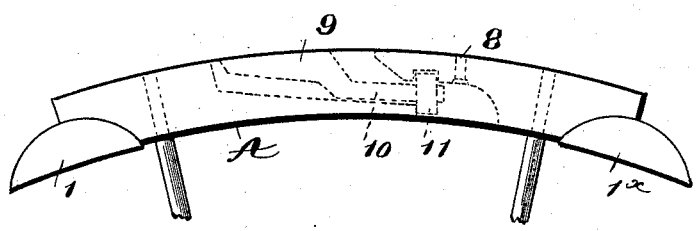
Figure 3:
Figure 4:
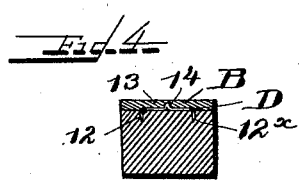
Figure 5:
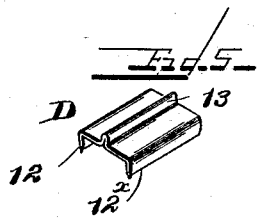

In the accompanying drawings, to which reference is had and which fully illustrate my invention, Figure 1 is a central vertical longitudinal section through the metal felly, showing my improvements applied to a wheel. Fig. 2 is a side view of the metal felly. Fig. 3 is a detail plan view showing the miter-joint of the tire. Fig. 4 is a transverse section through the felly, tire, and set and guide clips. Fig. 5 is a detail view of one of the set and guide clips.

A designates a metal felly formed of the curvature or contour of the wheel to which it is to be applied and of such length as to take in two spokes of the wheel, the ends of the spokes being fitted and secured in the metal felly as usual, as indicated in the drawings. To the respective ends of the metal felly are fixed clips 1 1$^\times$, which overlap the joint of the next wooden felly and have bolts 2 2 projected through them from the felly to fasten them in place and to the wheel. The bolt-hole 3 adjacent to the end of the wooden felly contiguous to the metal felly is made tapering inwardly, in order that when a loose tire is tightened the bolt may have room to be carried forward with the movement of the tire. In about the middle of the metal felly A and in the body of the metal felly is formed an elongated flaring mortise 6, in which the tightening-bolt of the tire projects and extends loosely through a central opening 7 in the shoulder 5, as shown in the drawings.

B designates the tire, secured to the wheel in the usual manner and to the metal felly by the bolts, as indicated, the fixed end of the tire being secured thereto by a short bolt 8 and the end edge being cut diagonal across, alining with the free end of the adjustable portion of the tire, so that they are arranged in juxtaposition, as with a miter-joint, as indicated in Fig. 3 of the drawings, which arrangement gives a smooth tread to the wheel at the juncture or meeting ends. Adjacent to the movable and adjustable end of the tire is rigidly secured, by welding it thereto, the draw-bolt C, which consists, preferably, of a body-piece 9, having its upper face welded to the tire, and a threaded bolt 10, integral therewith, projected from the body-piece at an incline and extending through the bolt-hole in the shoulder of the metal felly, as shown in Fig. 1 of the drawings, and on the projecting end of the draw-bolt is fitted a threaded nut 11, whereby the bolt may be drawn forward and the tire tightened.

In order that the tire may be held in lateral alinement on the wheel, I provide a set and guide clip D, disposed at determined intervals or spaces about the wheel. These set and guide clips are formed of a piece of steel plate having downward-projecting side flanges 12 12$^\times$, with sharpened edges adapted to be driven or pressed down in the wood of the fellies and having a central vertical flange 13, which fits and takes in a central groove or seat 14 in the inner face of the tire, as indicated in Fig. 4 of the drawings, so that when a loose tire is tightened the edge flanges of the clip will be drawn through and cut the wood felly, and at the same time the tire will be kept in edge alinement with the fellies of the wheel.

It will be perceived from the foregoing description, taken in connection with the drawings, that should the tire become loose after having been set to the wheel by use or shrinkage of the wheel the tire may be readily and conveniently tightened by simply screwing up the tightening-nut on the draw-bolt.

Having thus described my invention, what I claim as new, and desire to secure by Letters Patent, is—

1. In a wheel, the combination with the wooden fellies thereof, provided with a tapering bolt-hole adjacent to the metal felly, of an interposed metal felly formed with a nut-seat in its under face and a draw-bolt mortise opening through the face of the nut-seat, a tire on the wheel formed with central grooves or clip-seats and having a draw-bolt welded to its free end and extending through the mortise, a tightening and adjusting nut on the projecting end of the draw-bolt, and set and guide clips having downward-extending side flanges to take in the wood fellies and a vertical flange to take in the grooves or seats in the tire.

2. In a wheel, the combination with the wooden fellies thereof, of an interposed metal felly, formed with clips projecting beyond its ends to embrace the adjacent ends of the wooden fellies and having a tightening-nut seat in its under side and a draw-bolt mortise opening therethrough, a tire on the wheel formed with central clip-seats and having a draw-bolt integral with its free end and projecting into the mortise and through the nut-seat in the felly, a tightening-nut on the projecting end of the draw-bolt, and guide and set clips disposed between the tire and the fellies formed with sharp side flanges to cut into the face of the felly and a vertical central flange to engage in the central grooves or clip-seats of the tire.

In testimony whereof I affix my signature in presence of two witnesses.

ISAAC CLINTON GRAY.

Witnesses:
SAMUEL BARRETT,
CHARLES BAXTER.